US006563683B1

(12) United States Patent
Strúmpler

(10) Patent No.: US 6,563,683 B1
(45) Date of Patent: May 13, 2003

(54) ELECTRICAL SWITCHGEAR

(75) Inventor: Ralf Strúmpler, Gebenstorf (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/807,032

(22) PCT Filed: Sep. 29, 1999

(86) PCT No.: PCT/CH99/00462

§ 371 (c)(1),
(2), (4) Date: Apr. 9, 2001

(87) PCT Pub. No.: WO00/22638

PCT Pub. Date: Apr. 20, 2000

(30) Foreign Application Priority Data

Oct. 9, 1998 (DE) .......................... 198 46 639

(51) Int. Cl.⁷ .............................. H02H 3/00
(52) U.S. Cl. ................................... 361/93.1
(58) Field of Search ..................... 361/93.1, 93.9, 361/99

(56) References Cited

U.S. PATENT DOCUMENTS

| 5,374,792 A | 12/1994 | Ghezzo et al. |
| 5,430,597 A | 7/1995 | Bagepalli et al. |
| 5,454,904 A | 10/1995 | Ghezzo et al. |
| 6,317,530 B1 * | 11/2001 | Ford .......................... 385/17 |
| 6,373,007 B1 * | 4/2002 | Calcatera et al. ............ 200/181 |

FOREIGN PATENT DOCUMENTS

DE 4421980 A1 4/1995
WO WO97/18574 5/1997

OTHER PUBLICATIONS

Heinrich Stöckle, Bemessen von Relaisschaltungen, TOPP, Buchreihe Elektronik 51, ISBN 3–7724–0126–0, 1971, Verlag und Druckerei M. Frech, Stuttgart–Botnany Druck: Frech, stuttgard–Boptnang, p. 40.

Hiroshi Hosaka et al, Electromagnetic microrelays: concepts and fundamental characteristics, Sensors and Actuators A, 40 (1994) pp. 41–47.

"Micromechanic Membrane Switches on Silicon" by K. E. Petersen, IBM J. Res. Develop., vol. 3, No. 4, Jul. 1979, pp. 376–385.

R. Allen: "Simplified Processes Used to Make Micromachined FET–like Four–Terminal Microswitches and Microrelays" in Electronic Design, Jul. 8, 1996, p. 31.

E. Fullin et al, A New Basic Technology For Magnetic Micro–Actuators, CSEM Centre Swisse d'Electronique et de Microtechnique SA, Neuchatel, Switzerland, 1998 IEEE, pp. 143–147.

"Cylindrical Hall Device" by H. Blanchard, L. Chiesi, R. Racz and R. S. Popovic, Processings IEDM 96, pp. 541–544, IEEE 1996.

Siemens (H. F. Schlaak, F. Arndt, J. Schimkat. M. Hanke, Proc. Micro System Technology 96, 1996, pp. 463–468).

* cited by examiner

Primary Examiner—Matthew Nguyen
(74) Attorney, Agent, or Firm—Burns, Doane, Swecker & Mathis, L.L.P.

(57) ABSTRACT

The invention relates to a novel electrical switching device which comprises a switch panel 1 with series-connected and parallel-connected microrelay cells 3.

12 Claims, 1 Drawing Sheet

ELECTRICAL SWITCHGEAR

BACKGROUND OF THE INVENTION

The invention relates to an electrical switching device as claimed in the preamble of patent claim 1. Such a switching device is used in particular in the field of domestic electrical power supplies, electrical power supplies for medium-sized electric motors, and in the field of building technology, for lighting systems and for electrical systems in railroad vehicles, ships and the like. Voltages between 100 V and 1 kV, and load currents between 1 A and 75 A, are typical for this field of application.

A switching device of the abovementioned type is described in U.S. Pat No. 5,430,597. This switching device contains a switch panel which is connected between two electrical connections. Arranged on a substrate, the switch panel has a first number of parallel-connected current paths, in each case with a second number of series-connected microrelay cells. The number of microrelay cells is designed such that the currents which occur in conventional low-voltage AC power systems can be switched off. However, when switching a large current, it is impossible to reliably prevent individual microrelay cells from being overloaded.

Further switching devices with microrelay cells are described in DE-A 44 21 980, WO-A 97 18574, U.S. Pat No. 5,374,792 and U.S. Pat. No. 5,454,904.

SUMMARY OF THE INVENTION

The invention is based on the technological problem of providing a switching device with a good withstand voltage and a high current carrying capacity.

In the electrical switching device according to the invention, the microrelay cells are electrically connected to one another forming stages which have a voltage-dividing and current-dividing effect. Within one stage, the microrelay cells are joined together electrically before being connected to the next stage. In consequence, the current to be disconnected within a stage is distributed uniformly between all the microcells in that stage. This avoids overloading one or more microrelay cells in one stage, and thus results in the switching device having high operational reliability.

Furthermore, the microrelay cells are distinguished by extraordinary low switching power levels which, in conjunction with the multiplication of the switching power by the switch panel, also lead to a very low switching power in comparison to the current and voltage design of the switching device according to the invention. In this context, reference should be made to the explanation of the exemplary embodiment.

The microrelay cells can be produced by known micro technology methods, that is to say in particular by methods which have their origins in semiconductor technology. To this extent, microrelay cells are highly suitable for integration with other semiconductor devices, in particular transistors and integrated circuits. Accordingly, the switching device according to the invention can also in its entirety not only be integrated per se as a switch panel on a chip but, furthermore, may have further electrical devices on the same chip. These integration capabilities further reinforce the already mentioned advantages of low weight and small physical volume of the invention.

Finally, the invention can also lead to major advantages in the production of the switching device, not only with respect to the already mentioned integration capabilities. In particular, the switching device according to the invention can be produced using an unchanged standard technology or with an unchanged standard microrelay cell in various switch panel sizes since, for example, all that is necessary is to adapt the mask set of the corresponding process, or, in more general terms, the layer geometry. A very wide range of different electrical specifications can thus be covered in one production line which is largely standardized from the technological point of view. This results in considerable cost advantages, of course.

A final point which should be mentioned here is of particular interest for the overcurrent disconnection field covered by the contactors described initially, namely the extremely fast response time of the microrelay switches. A particularly interesting feature in this case is that the switching device according to the invention and having an entire switch panel of such microrelay cells has essentially the same response time as the individual cell. This advantage is thus reflected directly in the overall switching device, without scaling, from the technology of the individual microrelay cell. Thus, in comparison to conventional contactors whose capabilities are considerably limited by the inertia of the moving masses, this allows protective switching devices with an extraordinary fast response to be produced. In this case as well, reference is made to the exemplary embodiment described in the following text.

The invention preferably relates to electrostatically operated microrelay cells, that is to say those in which the moving contact piece is operated electrostatically. For this purpose, reference is made to the exemplary embodiment and to a silicon microrelay published by Siemens (H. F. Schlaak, F. Arndt, J. Schimkat, M. Hanke, Proc. Micro System Technology 96, 1996, pages 463–468). Reference is also made to R. Allen: "Simplified Processes Used to Make Micromachined FET-like Four-Terminal Microswitches and Microrelays" in Electronic Design, Jul. 8, 1996, page 31 and to "Micromechanic Membrane Switches on Silicon" by K. E. Petersen, IBM J. RES. DEVELOP., Volume 3, No. 4, July 1979, pages 376–385. The disclosure content of these sources and the sources cited in the following text are included in this application.

However, the invention also includes other microrelay cells, for example electromagnetically operated microrelay cells, in which, in general, planar spiral coils with ferromagnetic moving contact pieces are used. Piezoelectric microcells are also feasible, but these require relatively high drive voltages.

With regard to the already mentioned integration capabilities of the microrelay circuit according to the invention with further electronic components on a chip, this relates primarily to a current sensor for overcurrent protection. This current sensor monitors the current flowing through the switching device when it is switched on and initiates the opening process of the switching device above a specific current threshold value. This relates in particular to a Hall sensor, which can likewise be integrated on a chip, for example a silicon semiconductor chip or any other semiconductor chip. However, other substrates may also be used for integration. With regard to one possible technology for an integrated Hall current sensor, reference is made to "Cylindrical Hall Device" by H. Blanchard, L. Chiesi, R. Racz and R. S. Popovic, Processings IEDM 96, pages 541–544, IEEE 1996.

One technologically simple solution in this case is for the current sensor to be arranged outside the switch panel itself or at its edge, in order to allow the switch panel to be designed to be as compact and standard as possible. It is thus preferable for the current sensor to be provided upstream of the first or downstream of the last stage of the microrelay circuit.

However, according to the invention, a combination with a current sensor, in particular a Hall sensor, is also preferable, independently of an integrated solution. It may even be advantageous to dispense with complete integration. A more standardized switching device, for example, having a switch panel of microrelay cells can then in large quantities and, depending on the application, be specified with differently designed Hall sensors with respective response values. In this case, integration with a specific Hall sensor would considerably reduce the quantities for standard production.

Similar statements also apply to an electronic response monitoring device, which could likewise be integrated with the switch panel on a chip, or can be combined as part of the switching device according to the invention, separate from the switch panel. Such a response monitoring device records the response of the electrical switching device, particularly when the latter is used as an overcurrent protective switching device. This allows the switching device to be inhibited for a certain amount of time after response, before it can be switched on again in some other way. It is likewise possible for a defined test to be carried out after a response, during which test the switching device is switched on briefly in order to check whether the overcurrent state is still present, and thus to allow automatic reconnection after a temporary current surge. This response monitoring device furthermore allows a device for driving and evaluating a current sensor or an interface to an external control device to be linked to the switching device according to the invention.

A third option for combination with an additional circuit relates to a timer circuit which, for example, allows the switching device according to the invention to be used as an automatic time switch for lighting applications (stairwells). In this case as well, the timer circuit may also be integrated on a chip or a substrate or else may be combined as a separate part, in order to allow greater flexibility for large production quantities.

A typical exemplary embodiment of the invention is illustrated with respect to the figures in the following text. The features disclosed in this case may also be significant to the invention in other combinations.

DETAILED DESCRIPTION OF THE PREFERRED EMBODIMENTS

Figure 1:
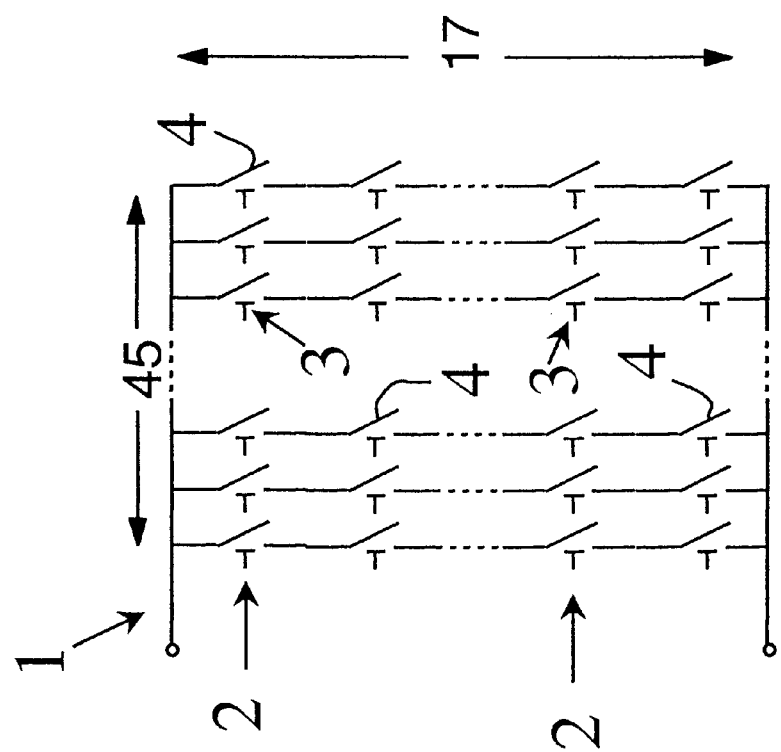
FIG. 1 shows a schematic circuit diagram of the switch panel of the switching device according to the invention.

FIG. 1 shows a switch panel 1 comprising 17 serial-connected stages 2 each having 45 parallel-connected microrelay cells 3. Technologically, each microrelay cell 3 corresponds to the already mentioned Siemens silicon microrelay and is electrically connected to in each case one microrelay cell 3 in the upstream stage 2 and one in the downstream stage 2. The connections for the last and first of the stages 2 are joined together on the respective outer side, and are connected to a common connection of the switch panel 1.

The highly schematic illustration also shows a moving contact piece 4, which in this case corresponds to a bar which can be bent or deflected electrostatically. The significant feature for the switching device according to the invention is that all these movable contact pieces 4 operate synchronously, that is to say they are opened and closed by a single common signal, acting in the same way as parts of a standard switch constructed for joint operation.

Each individual microrelay cell 3 can interrupt a voltage of about 24 V, so that the voltage which can be disconnected by the switch panel 1 is 400 V. This is a useful value for many applications, preferably and in particular for values above 200 or 300 V.

The switchable load current for each microrelay cell 3 is about 200 mA, thus resulting in a total current of 9 A for the switch panel 1.

These values are chosen such that they can be compared directly with a conventional standard contactor (for example A9 contactor (ABB Control, France)). This electromagnetic standard relay, which can disconnect a voltage of 400 V and can switch a load current of 9 A consumes an activation power of 2 W. In contrast, the entire switch panel 1 of the switching device according to the invention requires an activation power of only 5 mW, which represents a reduction by a factor of more than 500. With present-day technology, the power losses in a conventional relay when switched on are still somewhat lower (0.1 W) than for the switch panel 1 according to the invention, which requires 0.6–6 W. However, this value can be reduced considerably by a further improvement to the contacts and, possibly, by increasing the closing force of the microrelays. It can be seen that there is some freedom of action with regard to the closing force, particularly with regard to the extremely low activation power.

When comparing these values, it must be remembered that conventional contactors are switched off without any power, that is to say they consume said activation power when switched on. The A9 contactor, for example, thus consumes about 2.1 W when switched on, which is thus a multiple of the value which can be achieved by the invention.

Figure 2:
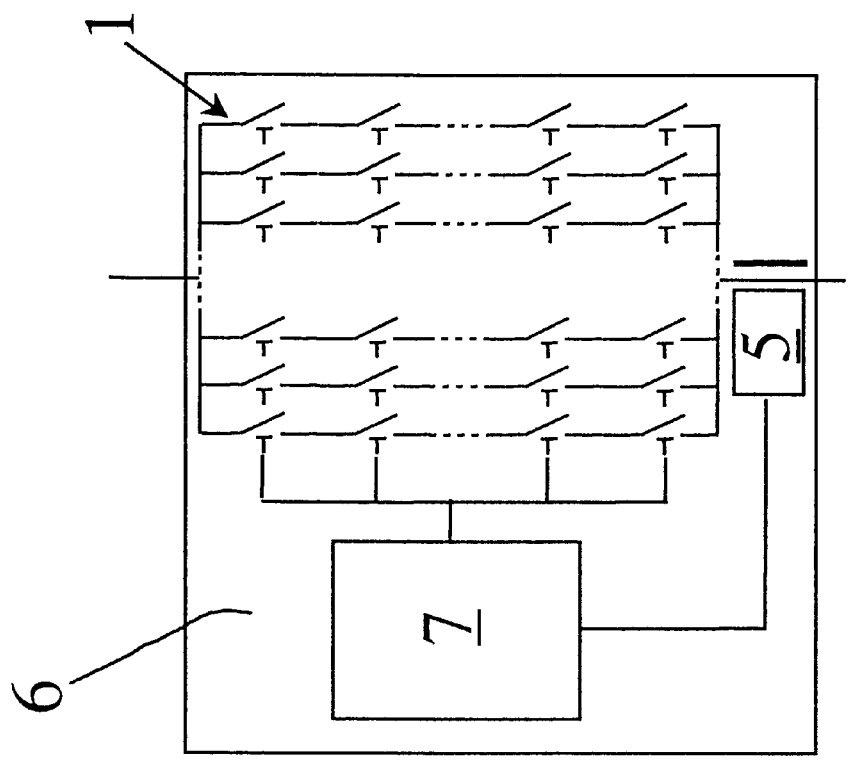
FIG. 2 shows the switching device with the switch panel and, integrated on the same chip, a Hall sensor and a response monitoring device.

FIG. 2 shows a silicon chip 6 corresponding to the switching device according to the invention and having the switch panel 1 which has already been described with reference to FIG. 1. In addition, a Hall sensor 5 is provided underneath an outermost (the lowermost in the figure) stage 2 of the switch panel 1. This is a Hall sensor integrated on the silicon chip 6, in a configuration which is suitable for radial magnetic fields, such as those which occur with electrical conductors in the form of lines. In this context, reference is made to the already cited publication "Cylindrical Hall Device".

This Hall sensor 5 is controlled via a connecting line by a control device 7 which evaluates the output signal from the Hall sensor 5 and applies the appropriate current to the Hall sensor 5. This control device 7 furthermore controls the switch panel 1, that is to say switches the switch panel 1 between the switched-on and switched-off states. In this case, all the moving contact pieces 4 of the individual microrelay cells 3 are opened at the same time and are closed at the same time.

This control device 7 may furthermore, if required, contain a timer circuit 8, although this is not shown separately here.

Overall, the invention allows the function of a conventional contactor with its drive electronics and current sensor to be produced on the silicon chip 6. This results in a physical volume of the order of magnitude of (30×50×1)

mm³ with a weight of about 10 g, as against comparable values for the already mentioned conventional electromagnetic A9 contactor of (44×74×74)mm³ and 340 g.

What is claimed is:

1. An electrical switching device for power applications having a current load capacity of at least one A and having a withstand voltage of at least 100 V with two electrical connections and a switch panel connected between the two electrical connections, containing a first number of parallel-connecting current paths each having a second number of series-connected microrelay cells, wherein the microrelay cells are electrically connected to one another, forming stages with a voltage-dividing and current-dividing effect, in such a manner that the microrelay cells in one stage are joined together electrically before being connected to the next stage.

2. The switching device as claimed in claim 1, wherein the microrelays are integrated on a chip.

3. The switching device as claimed in claim 2 having a current sensor and a response monitoring device, wherein the current sensor, the response monitoring device and/or a timer circuit are integrated on the chip.

4. The switching device as claimed in claim 3, wherein the current sensor is a Hall sensor.

5. The switching device as claimed in claim 1, in which a current sensor for overcurrent protection is combined with the microrelay circuit.

6. The switching device as claimed in claim 5, in which the current sensor is integrated with the microrelay circuit on a chip.

7. The switching device as claimed in claim 5, in which the current sensor is a Hall sensor.

8. The switching device as claimed in claim 7, in which the Hall sensor is arranged upstream of the first or downstream of the last stage in the microrelay circuit.

9. The switching device as claimed in claim 1, in which an electronic response monitoring device is combined with the microrelay circuit.

10. The switching device as claimed in claim 9, in which the electronic response monitoring device is integrated with the microrelay circuit on a chip.

11. The switching device as claimed in claim 1, in which a timer circuit is combined with the microrelay circuit.

12. The switching device as claimed in claim 11, in which the timer circuit is integrated with the microrelay circuit on a chip.

* * * * *